Sept. 30, 1958     J. A. DAVIES ET AL     2,853,750
EDGE TRIM DEVICE
Filed May 2, 1955
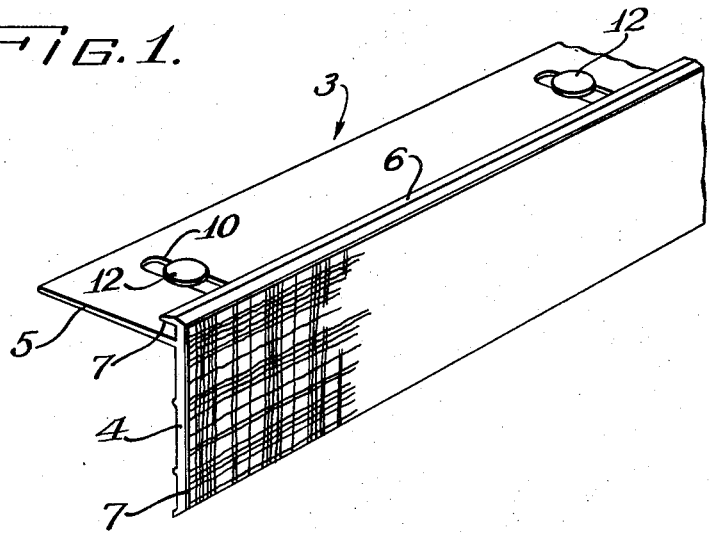
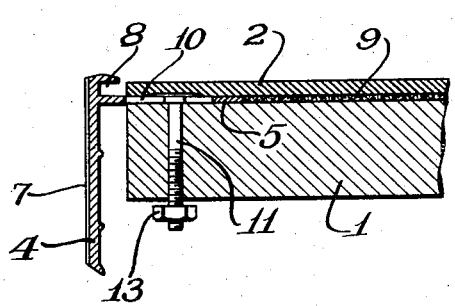
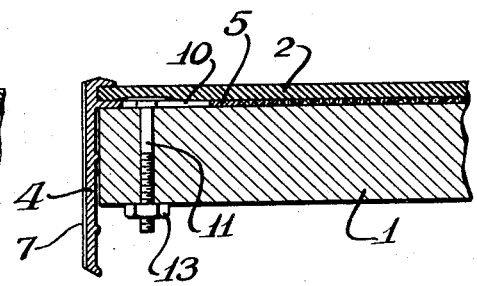
Inventors:
John A. Davies
Myron G. Sanders
Jay G. Somers
Ralph R. Cole
By Gary, Desmond & Parker
Attys.

United States Patent Office

2,853,750
Patented Sept. 30, 1958

2,853,750

EDGE TRIM DEVICE

John A. Davies, Myron G. Saunders, Jay G. Somers, and Ralph R. Cole, Wisconsin Rapids, Wis., assignors to Consoweld Corporation, Wisconsin Rapids, Wis., a corporation of Wisconsin Application May 2, 1955, Serial No. 505,221

1 Claim. (Cl. 20—74)

This invention relates to improvements in an edge trim device for table tops, sink tops, desk tops, counter tops and the like which may be covered by a decorative laminate.

In the application of decorative laminate surfaces to the tops of tables, sinks, desks, counters and the like, it is desirable to finish the edges thereof with a trim which, in addition to improving the appearance of the installation protects the edge of the laminate where it terminates adjacent the edge of the supporting structure.

Devices have heretofore been proposed for accomplishing the purpose, hereinbefore described, but such devices are unsatisfactory in that they are more or less complicated, expensive and difficult to apply or are so cumbersome as to detract from the appearance of the laminate.

The present invention is directed to a trim device of the character described which is easy to apply, enhances the appearance of the installation and is economical to construct and, in addition, protects the edge of the laminate from injury both during application of the trim device and during normal use of the structure which carries the laminate.

The objects, advantages and features of the present invention will be apparent from the accompanying drawing and following detailed description.

In the drawing, Fig. 1 is a perspective view of a section of the improved trim device contemplated in the present invention.

Fig. 2 is a sectional view, partially diagrammatic, illustrating the trim device in pre-securing position relative to the decorative laminate.

Fig. 3 is a view similar to Fig. 2 showing the trim device in laminate securing final position.

Referring in detail to the drawing, and with specific reference to Figs. 2 and 3, 1 indicates a support upon the upper surface of which a decorative laminate 2 is adapted to be positioned. The support 1 may comprise a table top, desk top, sink top, counter top or the like, and the decorative laminate 2 when applied to the top 1 is adapted to provide a surface which is attractive, resistant to stains, burns, abrasions and the like.

Normally, the decorative laminate is coextensive with the upper surface of the support 1. However, some treatment must be given to the edges of the laminate, that is, where the edges of the laminate terminate coextensive with the edges of the support. To merely leave the edges "raw," that is, in severed condition coextensive with the edges of the support detracts from the appearance of the structure and in addition said edges are exposed to the greatest wear and delamination may take place at said edges. To cure this defect a trim device is ordinarily employed. The subject of the present invention is directed to a trim device which is ideally adapted to perform the function of finishing the edges of the structure and of protecting the exposed edges of the decorative laminate.

Referring particularly to Fig. 1, a portion of a trim device embodying the concepts of the present invention is indicated by the reference numeral 3. The device 3 is preferably constructed of metal such as aluminum, stainless steel, or the like. The device is of angular construction and comprises a front flange 4 and an angularly disposed rearwardly extending flange 5. At the upper edge of the front flange 4 a bead 6 is formed, the rear edge of the bead 6 terminating in an overhanging shoulder 7. In view of the fact that the front flange 4 is exposed to view along the peripheral edges of the structure a panel 7 is disposed upon the outer surface of the flange. The panel may comprise a print sheet, similar to the print sheet employed upon the decorative laminate 2 and a face sheet similar to the face sheet upon the laminate 2, both of said sheets being laminated together and both being saturated or impregnated with resin in the manner hereinbefore described. The panel 7 thus formed may be adhesively united to the front face of the flange 4 and provides a border around the structure which harmonizes with the surface of the laminate 2.

The flange 5 is preferably disposed at right angles to the flange 4 and joins with said flange along a line on the flange 4 spaced from the shoulder 7 thus providing a groove 8 between the shoulder 7 and the upper surface of the flange 5 where it joins with the flange 4. Preferably, the thickness of the flange 5 is somewhat less than than the thickness of the flange 4.

In employing the trim device 3, the decorative laminate 2 is positioned upon the upper surface of the support 1 and is adhesively united by means of a suitable adhesive 9 throughout the major portion of the juxtaposed areas of the member 1 and laminate 2. The flange 5 is provided with a plurality of elongated slots 10 which are disposed with their axes at substantially right-angles to the plane of the flange 4, the slots 10 being spaced from each other throughout the length of the trim device. Bolts 11 may be positioned through the thickness of the supporting member 1, said bolts being positioned adjacent the edge of the supporting member and in spaced relationship corresponding to the spacing of adjacent slots in the flange 5. In positioning the bolts through the support 1, said bolts are also projected through slots 10, said bolts having relatively flat heads 12 which engage the upper surface of the flange 5 adjacent the sides of the slot.

Initially the device 3 is positioned with the inner face of the flange 4 spaced from the defining edges of the support 1 and decorative laminate 2, as illustrated in Fig. 2. In this position the bolt heads 12 will be disposed at the outer ends of the slots 10 and the flange 5 will be positioned beneath the edge portion of the decorative laminate 2. Thus, before the laminate is applied to the support 1, the trim devices may be mounted in position and the edge portions of the laminate may be laid over the flange 5 without bending or buckling the laminate. When the device is in this position nuts 13 carried at the ends of the bolts 11 are loose whereby the flange 5 may be readily moved toward the edges of the support 1 and decorative laminate 2. After the laminate has been disposed in desired coextensive relationship with the upper surface of the support 1 and has been secured thereto by the adhesive 9 the trim device 3 may be moved inwardly toward the edges of the support 1 and decorative laminate 2, the shoulder 7 moving over the edge portions of the decorative laminate and confining said edge portions in the slot 8. After the trim device has been so moved, the nuts 13 may be tightened whereby the trim device may be securely locked upon the edge portions of the structure. This position of the parts is illustrated in Fig. 3.

The slot 8 is of a width slightly greater than the thickness of the laminate 2 whereby the laminate snugly fits into said slot. However, it will be noted that the tightening of the nuts 13 when the trim device is in the position shown in Fig. 3 does not cause the shoulder portion 7 of the bead 6 to bite into or mar the edge portion of the laminate. Yet, said edge portion is adequately protected by the trim device. The bead 6 is preferably polished and adds an attractive finish to the edge portions of the structure.

Although bolts are the preferable fastening means employed, nails or screws may be used, if desired. The nails or screws if used would, of course, have relatively flat heads so as to not unduly raise the surface of the superimposed laminate. To mount the trim device, if nails or screws are used, the nails or screws would be initially driven into the support 1 when the trim device is in the position illustrated in Fig. 2, before the laminate edge portion overlays the heads of the fastening means. To move the trim device from the position shown in Fig. 2 to the position shown in Fig. 3 it would then be necessary to force the trim device inwardly toward the edge of the support 1 by hammering. In some instances this type of fastening may be found suitable.

We claim as our invention:

The combination of a trim device with a supporting structure carrying a surface panel of the decorative laminate type which comprises, a supporting structure having a defining edge, a decorative laminate panel positioned in plane parallel relationship upon a surface of said supporting structure and having an edge terminating at the defining edge of said structure, a trim device for the common defining edges of said structure and said panel, said trim device comprising a front flange which extends below said supporting structure and a securing flange rearwardly extending from the front flange and disposed at substantially right-angles to the front flange, a decorative panel carried by the front face of said front flange, a rearwardly extending shoulder carried by a longitudinal edge portion of the front flange and overhanging a portion of and spaced from the securing flange whereby a groove is provided between said shoulder and a portion of the securing flange, said securing flange being provided with a plurality of elongated slots, bolts carried by said shoulder supporting structure and extending through said slots and through the supporting structure with the securing flange disposed adjacent the surface of the supporting structure and beneath the edge portion of the panel, nuts carried by said bolts at the opposite side of said supporting structure, said slots having the axes substantially at right-angles to the front flange whereby said trim device is movable from a position where the overhanging shoulder is spaced outwardly from the defining edge of the panel to a securable position where the edge portion of the surface panel is confined in said groove with the shoulder overhanging the outer surface of the edge portion of the panel.

References Cited in the file of this patent

UNITED STATES PATENTS

| | | |
|---|---|---|
| 1,611,211 | Loehr | Dec. 21, 1926 |
| 1,768,731 | Aubrey | July 1, 1930 |
| 1,989,814 | MacNab et al. | Feb. 5, 1935 |
| 2,205,044 | Moore | June 18, 1940 |
| 2,292,755 | Hall | Aug. 11, 1942 |
| 2,612,423 | Hennell | Sept. 30, 1952 |
| 2,705,820 | Torrence | Apr. 12, 1955 |